(12) United States Patent
Grochocki, Jr. et al.

(10) Patent No.: US 11,423,057 B2
(45) Date of Patent: Aug. 23, 2022

(54) IMPRESSION TAGGING SYSTEM FOR LOCATIONS

(71) Applicant: Microsoft Technology Licensing, LLC, Redmond, WA (US)

(72) Inventors: David Grochocki, Jr., Seattle, WA (US); Silvana P. Moncayo Torres, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 16/773,266

(22) Filed: Jan. 27, 2020

(65) Prior Publication Data

US 2020/0192918 A1    Jun. 18, 2020

Related U.S. Application Data

(63) Continuation of application No. 15/491,117, filed on Apr. 19, 2017, now Pat. No. 10,545,996.

(51) Int. Cl.
| | |
|---|---|
| *G06F 16/28* | (2019.01) |
| *G06F 16/29* | (2019.01) |
| *G06F 16/2457* | (2019.01) |
| *G06F 3/0484* | (2022.01) |
| *G06F 3/04842* | (2022.01) |
| *G06Q 10/10* | (2012.01) |
| *G06Q 30/02* | (2012.01) |

(52) U.S. Cl.
CPC ........ *G06F 16/285* (2019.01); *G06F 3/04842* (2013.01); *G06F 16/24573* (2019.01); *G06F 16/29* (2019.01); *G06Q 10/10* (2013.01); *G06Q 30/0201* (2013.01)

(58) Field of Classification Search
CPC .. G06F 16/285; G06F 16/24573; G06F 16/29; G06F 3/04842; G06Q 10/10; G06Q 30/0201
USPC ........................................... 707/737
See application file for complete search history.

(56) References Cited

U.S. PATENT DOCUMENTS 7,383,130 B1 *  6/2008  Koosam ................ G01W 1/00
                                                        702/3
8,566,329 B1 * 10/2013  Freed ...................... G06F 16/14
                                                        707/913

(Continued)

*Primary Examiner* — Phuong Thao Cao
(74) *Attorney, Agent, or Firm* — Alleman Hall Creasman & Tuttle LLP

(57) ABSTRACT

A server system comprising a processor configured to manage an extensible taxonomy of impression tags for categorizing the plurality of locations, monitor content sources for visitor impressions of the plurality of locations and extract a plurality of impression tag inputs from the visitor impressions, each impression tag input including an identified impression tag, a visited location of the plurality of locations, and visited location context data including a visited time interval of the plurality of time intervals, for each impression tag input, aggregate that impression tag input into aggregated impression tag input data in a location profile of the plurality of location profiles that is associated with the visited location of that impression tag input, and for each location profile, select one or more categorizing impression tags from the extensible taxonomy of impression tags based on at least the aggregated impression tag input data of that location profile.

13 Claims, 8 Drawing Sheets

(56) References Cited

U.S. PATENT DOCUMENTS

| | | | |
|---|---|---|---|
| 8,645,317 B1* | 2/2014 | Klimetschek | G06F 16/958 707/609 |
| 9,851,471 B2* | 12/2017 | Praun | G01W 1/10 |
| 10,296,525 B2* | 5/2019 | Brewington | G06F 16/29 |
| 2002/0069312 A1* | 6/2002 | Jones | G06Q 30/02 711/100 |
| 2002/0160817 A1* | 10/2002 | Salmimaa | G06F 3/04817 455/566 |
| 2004/0003706 A1* | 1/2004 | Tagawa | G01C 21/26 |
| 2008/0229910 A1* | 9/2008 | Kobayashi | G06Q 99/00 84/601 |
| 2009/0293017 A1* | 11/2009 | Carter | G06F 3/0481 715/811 |
| 2010/0262597 A1* | 10/2010 | Han | G06F 16/313 707/723 |
| 2010/0312767 A1* | 12/2010 | Saito | G06Q 30/02 707/E17.022 |
| 2011/0072015 A1* | 3/2011 | Lin | G06F 16/51 707/E17.074 |
| 2011/0238674 A1* | 9/2011 | Avner | G06F 16/367 707/E17.014 |
| 2012/0057646 A1* | 3/2012 | Jovicic | H04W 4/021 375/295 |
| 2013/0027227 A1* | 1/2013 | Nordstrom | G01C 21/3438 340/990 |
| 2013/0337838 A1* | 12/2013 | Kolodziej | G06Q 30/0261 455/456.3 |
| 2014/0228056 A1* | 8/2014 | Busch | H04L 67/18 455/456.3 |
| 2014/0280292 A1* | 9/2014 | Skinder | G06F 16/3338 707/767 |
| 2014/0297415 A1* | 10/2014 | Chu | G06Q 30/0261 705/14.58 |
| 2015/0025998 A1* | 1/2015 | Kang | G06Q 30/0631 705/26.7 |
| 2015/0199380 A1* | 7/2015 | Avramova | G06F 16/9537 707/738 |
| 2015/0242419 A1* | 8/2015 | Holmquist | G06F 16/9537 707/706 |
| 2017/0017928 A1* | 1/2017 | Miller | G06Q 10/1095 |
| 2017/0300504 A1* | 10/2017 | Wang | G06F 16/24578 |
| 2017/0300511 A1* | 10/2017 | Brewington | G06F 16/29 |
| 2019/0020817 A1* | 1/2019 | Shan | G06T 7/248 |

* cited by examiner

IMPRESSION TAGGING SYSTEM FOR LOCATIONS

CROSS REFERENCE TO RELATED APPLICATIONS

This application is a continuation of U.S. patent application Ser. No. 15/491,117, filed Apr. 19, 2017, now issued as U.S. Pat. No. 10,545,996, the entirety of which is hereby incorporated herein by reference for all purposes.

BACKGROUND

In Internet based map services, locations may be tagged by users, using tags sometimes referred to as "placemarkers." After creating a tag at a given location, a user may enter a name for the tagged location, and categorize the location by location type, such as park or restaurant, for example. Some location tagging services also enable a user to tag the location with feedback, for example by selecting a "like" or "heart" feedback option. However, these feedback options are constrained to a few predefined types of feedback tags. By constraining users to only select between a few different predefined feedback tag options, these services limit the ability of users to express a full range of human reactions.

SUMMARY

To address the above issue, a server system is provided, which may include a processor configured to store a plurality of location profiles respectively associated with a plurality of locations, each location profile having calendar data including a plurality of time intervals, manage an extensible taxonomy of impression tags for categorizing the plurality of locations, monitor content sources for visitor impressions of the plurality of locations and extract a plurality of impression tag inputs from the visitor impressions, each impression tag input including an identified impression tag, a visited location of the plurality of locations, and visited location context data including a visited time interval of the plurality of time intervals, based on at least a determination that one of the identified impression tags of the plurality of extracted impression tag inputs is not included in the extensible taxonomy of impression tags, extend the extensible taxonomy of impression tags with the one of the identified impression tags as a crowd-sourced impression tag, for each impression tag input, aggregate that impression tag input into aggregated impression tag input data in a location profile of the plurality of location profiles that is associated with the visited location of that impression tag input, and for each location profile, select one or more categorizing impression tags from the extensible taxonomy of impression tags for each of the plurality of time intervals based on at least the aggregated impression tag input data of that location profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed in detail below, the inventors have recognized that unstructured freeform tagging may have ambiguous and complex interpretations. On the other hand, constrained forms of tagging that limit users to only selecting from among a small set of predefined tags may be too limiting to express the full range of human emotions and the full spectrum of human reactions. The systems and methods described herein have been devised to address this challenge.

Figure 1:
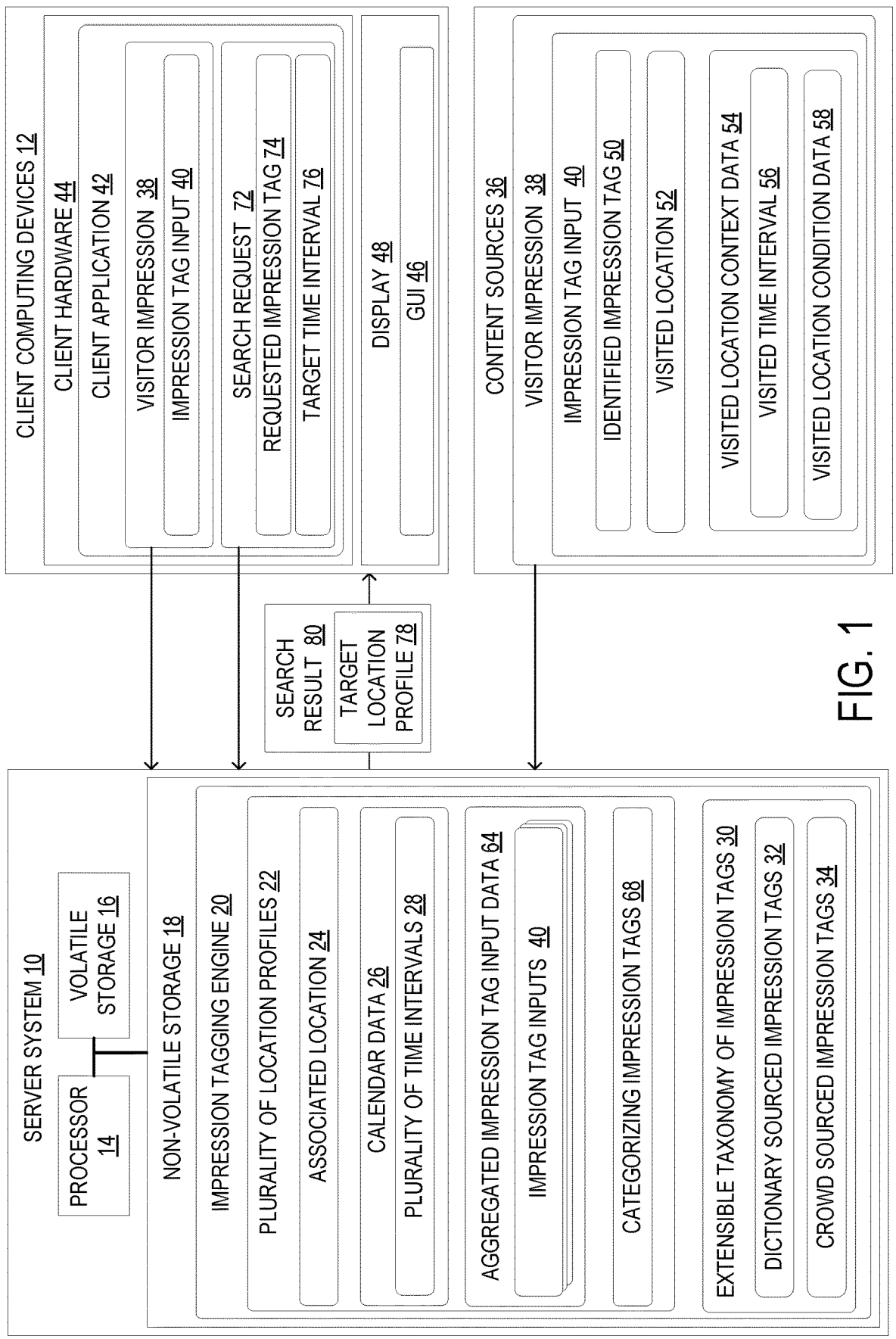
FIG. 1 shows a schematic representation of a server system according to one embodiment of the present disclosure.

FIG. 1 illustrates a schematic representation of a server system 10 providing an impression tagging service for users of client computing devices 12. The client computing devices 12 may take the form of mobile computing devices, desktop computing devices, laptop computing devices, wrist-mounted computing devices, and other forms of computing devices that may be used to communicate with the server system 10 over a network.

As illustrated, the server system 10 includes a processor 14, volatile storage 16, and non-volatile storage 18. In one example, the server system 10 includes a plurality of server devices, each server device including a processor 14, volatile storage 16, non-volatile storage 18. The plurality of server devices may be configured to enact the methods described herein in concert. However, it will be appreciated that any suitable server system architecture may be used to enact the systems and methods described herein.

In one example, processor 14 of the server system 10 is configured to execute instructions stored on the non-volatile storage 18 for an impression tagging engine 20. As illustrated, the impression tagging engine 20 is configured to store a plurality of location profiles 22 respectively associated with a plurality of locations. Each location profile 22 includes an associated location 24 of the plurality of locations. Each of the plurality of locations are physical places that are known to the impression tagging engine 20. For example, the plurality of locations may include buildings, businesses, routes, landmarks, geolocations, collections of locations, and other types of physical locations or methods of demarcating locations in the world. Each of the plurality of locations profiles 22 may include location data for its associated location 24. For example, a location profile may include a street address for the associated location 24. However, it will be appreciated that other types of location data may be stored by the plurality of locations profiles.

As illustrated in FIG. 1, each location profile of the plurality of locations profiles 22 further includes calendar data 26 including a plurality of time intervals 28. The calendar data 26 organizes calendar information for the associated location 24 of that location profile. For example, if the associated location 24 is a store, the calendar data 26 may include information for the hours that the store is open. In this example, the calendar data 26 for each of the plurality of location profiles 22 may include a plurality of time intervals 28 including day, time of day, month, year, season, and other types of time intervals suitable for the type of location. In another example, the associated location 24 may be a public location such as a public square that is open at all hours of the day. Thus, in this example, the calendar data 26 for each of the plurality of location profiles 22 includes event time intervals of the plurality of time intervals 28 for events that occur at the associated location 24. For example, the calendar data 26 may include data regarding events that will occur at the associated location 24 including how long the event will last. It will be appreciated that the above examples of the plurality of time intervals 28 are merely illustrative, and other types of time intervals and combinations of different time intervals not specifically mentioned above may also be included in the calendar data 26 of the plurality of location profiles 22.

As discussed previously, unstructured freeform tagging may generate data sets that have ambiguous and complex interpretations. To address this issue, the impression tagging engine 20 executed by the processor 14 of the server system 10 is configured to manage an extensible taxonomy of impression tags 30 for categorizing the plurality of locations of the plurality of location profiles 22. As shown, the extensible taxonomy of impression tags 30 includes dictionary impression tags 32 which is a set of predetermined impression tags that initially populates the extensible taxonomy of impression tags 30. The dictionary impression tags 32 may include known descriptive words, phrases, idioms, acronyms, etc., that are commonly used during conversation.

In one example, the extensible taxonomy of impression tags 30 may also include emoticons and user uploaded images in addition to words in the dictionary sourced impression tags 32. For emoticons, the extensible taxonomy of impression tags 30 may include commonly used emoticons with associated meanings. For example, the extensible taxonomy of impression tags 30 may include a "happy face" emoticon that is associated with an impression tag for happiness in the extensible taxonomy of impression tags 30. As another example, the extensible taxonomy of impression tags 30 may include images or pictures that may evoke specific emotions or impressions. For example, the extensible taxonomy of impression tags 30 may include an image of a fireplace that may be associated with a "cozy" impression. It will be appreciated that the above examples of types of impression tags are merely illustrative, and other types of impression tags not specifically mentioned above may also be included in the extensible taxonomy of impression tags 30.

As described above, the extensible taxonomy of impression tags 30 may be prepopulated with a predetermined list of dictionary sourced impression tags 32, including words, phrases, emoticons, images, etc. the impression tagging engine 20 may include predetermined semantics for these prepopulated impression tags, including synonyms, antonyms, etc. Thus, the impression tagging engine 20 may be configured to recognize and understand these impression tags in online content.

As shown, the extensible taxonomy of impression tags 30 may be further extended to include crowd sourced impression tags 34. The crowd sourced impression tags 34 may comprise impression tags that are not included in the base dictionary sourced impression tags 32, but are sourced from user generated content and various content sources. The impression tagging engine 20 may recognize that a word or phrase was used to describe a location via established grammar rules and conventions of the language. For example, the impression tagging engine 20 may recognize that words or phrase preceded by a hashtag may likely include descriptive content, a user impression, or a reaction for a location. Thus, even if the particular word or phrase is not currently included in the extensible taxonomy of impression tags 30, the impression tagging engine 20 may recognize that the word or phrase was used to describe a location and extract that word or phrase as a new impression tag to be added to the crowd sourced impression tags 34.

The impression tagging engine 20 executed by the processor 14 of the server system is configured to monitor content sources 36 for visitor impressions 38 of the plurality of locations and extract a plurality of impression tag inputs 40 from the visitor impressions 38. For example, the content sources 36 may include online social networking services, online review services, online media services, and other types of online content sources that allow users to post content relating to locations in the world. In another example, the client computing devices 12 may be included in the content sources 36. For example, the client computing device 12 may execute a client application 42 via client hardware 44. The client hardware 44 may include any suitable hardware components to execute applications on the client computing devices 12, such as a processor, volatile storage, non-volatile storage, etc. The client application 42 executed on a client computing device 12 may be configured to communicate with the impression tagging engine 20 executed by the server system 10.

In the illustrated example, the client application 42 includes a graphical user interface (GUI) 46 that is presented to the user via a display 48 of the client computing device 12. The client application 42 may be configured to elicit a visitor impression 38 from the user of the client computing device 12 and receive impression tag input 40 via the GUI 46 presented to the user. The received impression tag inputs 40 may then be sent to the impression tagging engine 20.

The impression tagging engine 20 is configured to extract the impression tag input 40 from the visitor impression 38 retrieved from the content sources 36 of client computing devices 12. As shown, after extraction by the impression tagging engine 20, each impression tag input 40 may include an identified impression tag 52, a visited location 52 of the plurality of locations, and visited location context data 54 including a visited time interval 56 of the plurality of time intervals 28. In one example, the impression tagging engine 20 receives raw data for the visitor impressions 38, such as a user review or a user post on a social networking service. In this example, the impression tagging engine 20 may be configured to identify and extract the impression tag 52 from the written content. The impression tagging engine 20 may determine the visited location 52 from the written content, such as if the user wrote an address or name for the location in the visitor impression 38, or metadata such as geolocation data that was associated with the content of the visitor impression 38 by the content source 36.

Additionally, the impression tagging engine 20 may also determine the visited location context data 54, including the visited time interval 56, based on metadata associated with the visitor impression 38. For example, a timestamp for the visitor impression 38 may be used to determine when the visited location 52 was visited. If the user visited at 8:00 PM, then the impression tagging engine 20 may determine that the impression tag input 40 has an evening visited time interval 56. The visited time interval 56 may be selected from one of the plurality of time intervals. Thus, the visited time interval 56 may include a time of day, a day of the month, a month, a season, a duration of an event, etc., depending upon the type of time intervals appropriate for the visited location 52.

As shown, the visited location context data 54 of each impression tag input 40 may further include a visited location condition 58 of a plurality of location conditions. The visited location condition 58 indicates a physical condition of the visited location 52 when the visitor impression 38 was generated. In one example, the plurality of location conditions includes weather conditions. Thus, the visited location condition data 58 may indicate whether the weather was rainy, runny, cold, hot, or any other type of weather condition, when the visitor created the visitor impression 38. To determine the visited location condition data 58, the impression tagging engine 20 may be configured to retrieve weather data for the area of the visited location 52. For example, if the visited location 52 is a store in Portland, Oreg., the impression tagging engine 20 may retrieve weather data for Portland, Oreg. from any suitable weather database service, and determine what the weather condition for Portland, Oreg. was at the visited time interval 56. In another example, the visited location condition 58 make indicate other conditions of the location such as nearby events that may impact the visited location.

Figure 2:
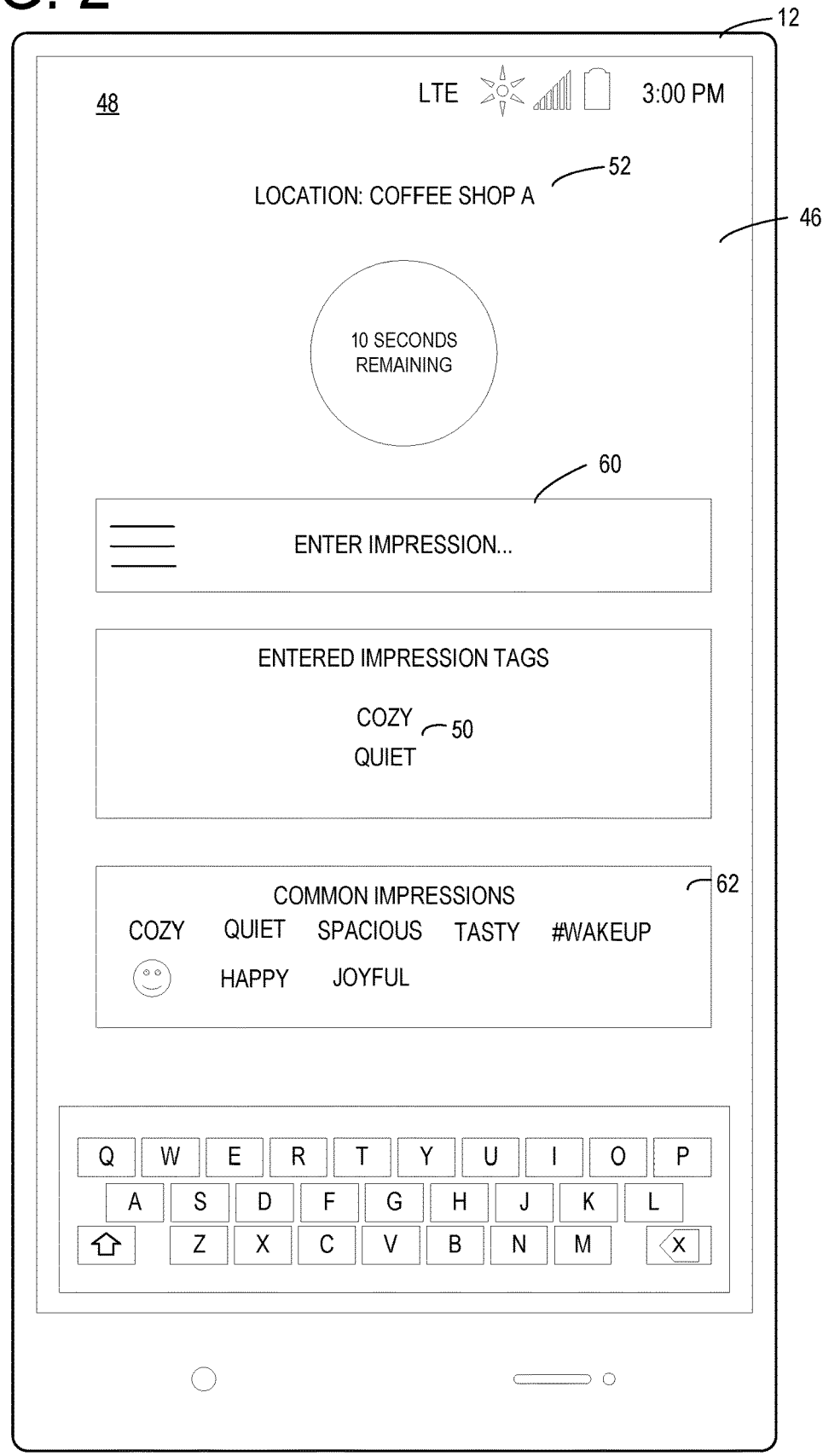
FIG. 2 shows an example graphical user interface for a client application in communication with the server system of FIG. 1.

FIG. 2 illustrates an example GUI 46 shown on a display 48 of an example client computing device 12, which is a mobile computing device in this example. As shown, the client application 42 executed by the client computing device 12 is configured to elicit a visitor impression 38 from the user of the client computing device 12. In the illustrated example, the client application 42 determine that the user is currently at a store COFFEE SHOP A, which is the visited location 52 in this example. The example GUI 46 includes an entry field 60 where the user may enter one or more impression tags via an input device, such as a touch capacitive display of the mobile computing device. In this specific example, the GUI 46 further includes a GUI element that has a countdown timer, which may be configured to elicit the user's initial first impressions of gut reactions to the visited location. As shown, the user has entered two impression tags, "cozy" and "quiet", which are extracted as the identified impression tags 50 for the impression tag input 40.

After receiving the impression tags entered by the user, the client application 42 executed by the client computing device 12 may be configured to send the entered impression tags to the server system 10 as the visitor impression 38, which includes impression tag input 40 having the entered impression tags of "cozy" and "quiet". The client application 42 may be further configured to attach metadata to the visitor impression 38, including the current time of 3:00 PM when the user was entering the impression tags. After receiving the visitor impression 38 from the client application executed by the client computing device 12, the impression tagging engine 20 may extract the impression tag input 40, which includes the entered impression tags of "cozy" and "quiet". The impression tagging engine 20 may then identify the entered impression tags with the extensible taxonomy of impression tags 30. The impression tagging engine 20 may also determine the visited location context data 54 based on the metadata including the timestamp of 3:00 PM for the visitor impression 38. Thus, in this example, the impression tagging engine 20 may determine that the visited time interval 56 is in the afternoon time interval, and may determine visited location condition data 58, such as the weather, by querying weather data for the weather condition at 3:00 PM. In this manner, the impression tagging engine 20 may extract the impression tag input 40 from the visitor impression 38 received from the client computing device 12.

In one example, the GUI 46 is configured to allow the user to freely enter their impressions into the entry field 60 without providing any suggested impression tags. In another example, the GUI 46 may provide a list 62 of suggested impression tags to the user. In this example, the server system 10 may be configured to send the extensible taxonomy of impression tags 30 to a client computing device 12. After receiving the extensible taxonomy of impression tags 30, the client application 42 may present a subset of the extensible taxonomy of impression tags 30 to the user via the GUI 46. In the example illustrated in FIG. 2, the client application 42 presents the user with a list 62 of common impressions from the extensible taxonomy of impression tags 30. The client application 42 may be configured to receive a user selection of one or more of the impression tags in the list 62 of impression tags. After the user has selected one or more of the impression tags, the impression tagging engine 20 may receive an impression tag input 40 from the client computing device 12 including a user selection of one of the impression tags from the extensible taxonomy of impression tags 30 as the identified impression tag 50. It will be appreciated that the user may enter or select impression tags via any suitable input method. For example, the user may enter the impression tags via text input to an entry field 60 of the GUI 46. In another example, the user may enter the impression tags via voice input to a microphone of the client computing device 12.

Figure 3:
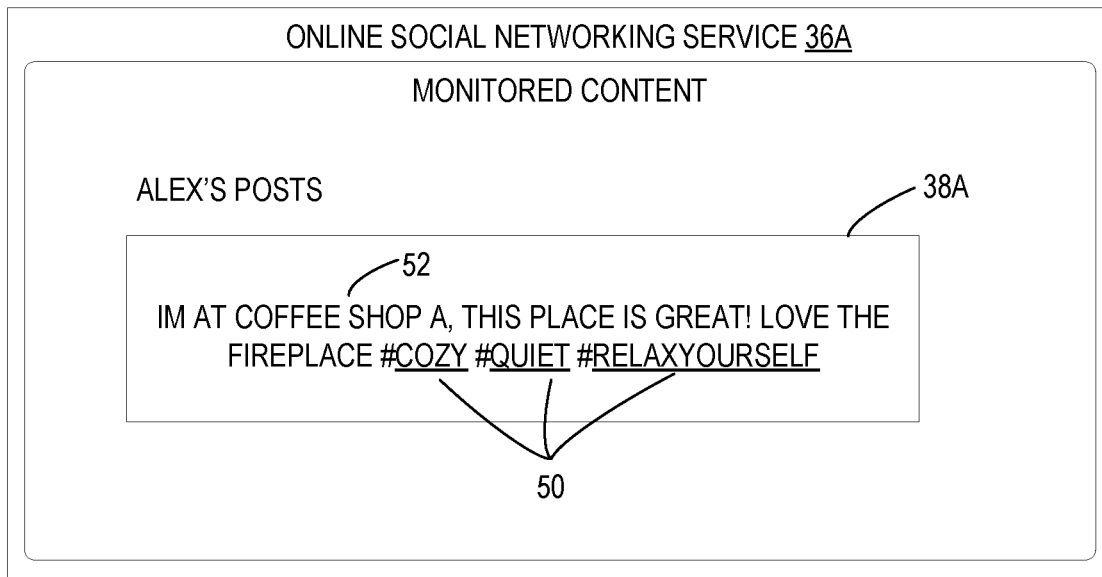
FIG. 3 shows example content sources monitored by the server system of claim 1.
Figure 3:
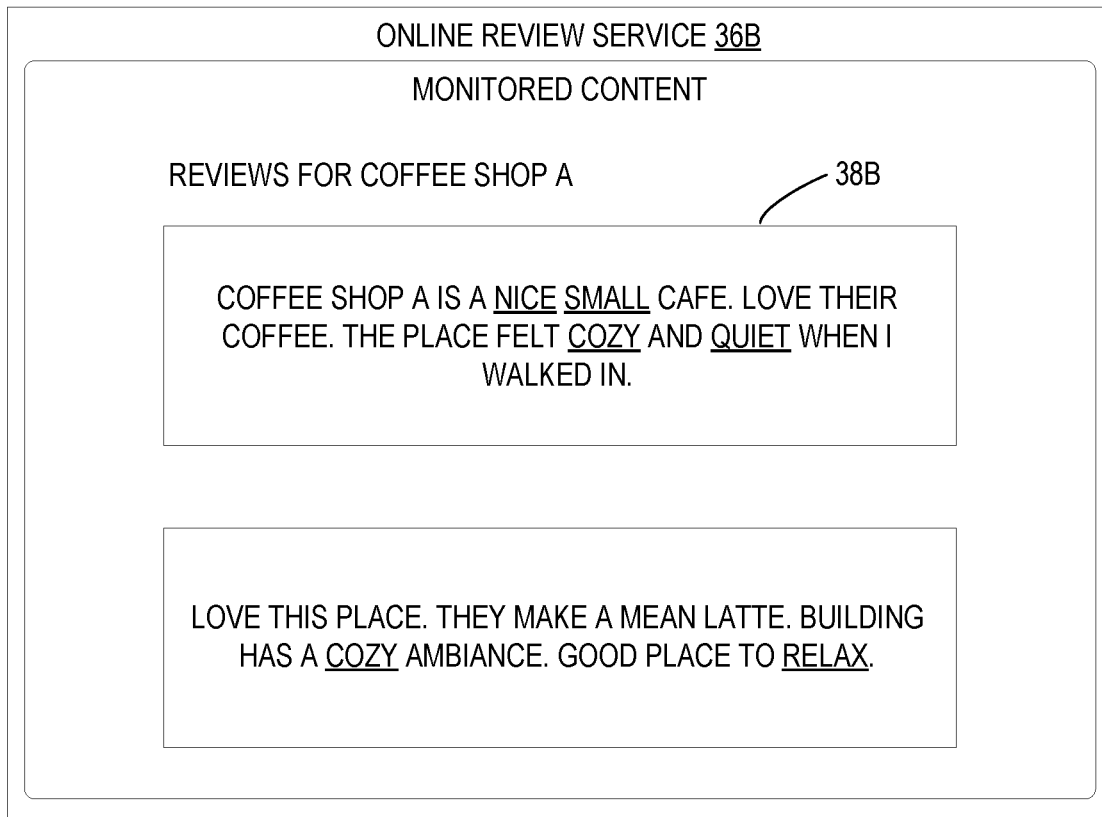

As discussed previously, the impression tagging engine 20 may monitor a plurality of different content sources, and is not limited to retrieving visitor impressions 38 only from client computing devices 12. FIG. 3 illustrates two examples of content sources 36 that the impression tagging engine 20 may monitor for visitor impressions 38. In one example, the content sources 36 include an online social networking service 36A where users may generate posts. In the illustrated example, a user has created a post including an example visitor impression 38A. The impression tagging engine 20 may be configured to perform semantic analysis on the example visitor impression 38A to determine that the visited location 52 is the coffee shop A. Additionally, based on hashtag conventions for online social networking services, the impression tagging engine 20 may determine that the content of "#cozy #quiet #relaxyourself" includes three impression tags of "cozy", "quiet", and "relaxyourself". The impression tagging engine 20 may compare the extracted impression tags to the extensible taxonomy of impression tags 30, and may identify both "cozy" and "quiet" based on the extensible taxonomy of impression tags 30.

However, the impression tag of "relaxyourself" may be an uncommon phrase that was not already included in the dictionary sourced impression tags 32 of the extensible taxonomy of impression tags 30. Although the phrase was not included in the extensible taxonomy of impression tags 30, the impression tagging system 20 may still be determine that the phrase is still an impression tag due to the hashtag convention. In one example, based on at least a determination that one of the identified impression tags 50 of the plurality of extracted impression tag inputs 40 is not included in the extensible taxonomy of impression tags 30, the impression tagging engine 20 executed by the server system 10 may be configured to extend the extensible taxonomy of impression tags 30 with the one of the identified impression tags as a crowd-sourced impression tag 34. In the illustrated example, the impression tagging engine 20 may add the phrase "relaxyourself" to the extensible taxonomy of impression tags 30 as a crowd sourced impression tag 34. Thus, as other people use the phrase "relaxyourself" in other visitor impressions 38, the impression tagging engine 20 may identify that phrase as an impression tag without relying on language conventions such as the hashtag.

As the crowd sourced impression tags 34 include uncommon tags outside the dictionary sourced impression tags 32, it is likely that crowd sourced impression tags 32 will tend to quickly trend upward in use and subsequently quickly trend downward in use. In one example, the impression tagging engine 20 is configured to calculate an extraction frequency for each of the crowd sourced impression tags 34. That is, the impression tagging engine 20 maintains a record of how often each of the crowd sourced impression tags 34 are identified in visitor impressions 38 over a period of time, such as every month. In this example, based on at least a determination that one of the crowd-sourced impression tags 34 of the extensible taxonomy of impression tags 30 has an extraction frequency that is lower than a threshold frequency value, the impression tagging engine 20 executed by processor 14 is further configured to remove the one of the crowd-sourced impression tags from the extensible taxonomy of impression tags 30. It will be appreciated that the threshold frequency value may be set to any value suitable value. For example, the threshold frequency value may be set to 10 extractions per month, such that if a specific crowd sourced impression tag is being extracted and identified less than 10 times per month, then the impression tagging engine 20 may be configured to remove that specific crowd sourced impression tag from the extensible taxonomy of impression tags 30.

Turning back to FIG. 3, as another example, the content sources 36 include an online review service 36B. The impression tagging engine 20 executed on the server system 10 may monitor the online review service 36B for reviews related to one of the plurality of locations known to the impression tagging engine 20. In the illustrated example, the impression tagging engine 20 identifies two user reviews for the location coffee shop A, and retrieves the two reviews at visitor impressions 38B. As discussed previously, the impression tagging engine 20 may extract impression tags from the visitor impressions 38B based on grammar and language conventions. In the illustrated example, the impression tagging engine 20 extracts the identified impression tags 50 of "nice", "small", "cozy", and "quiet" from the first review, and extracts the identified impression tags 50 of "cozy" and "relax" from the second review. In this manner, the impression tagging engine 20 may extract the impression tag input 40 including the identified impression tags 50, and may determine the visited location context data 54 based on metadata such as a timestamp attached to the reviews by the online review service 36B.

Turning back to FIG. 1, the impression tagging engine 20 of the server system 10 is configured to monitor content sources 36 and extract a plurality of visitor impressions 38 including a plurality of impression tag input 40. The impression tagging engine 20 is further configured to, for each impression tag input 40, aggregate that impression tag input 40 into aggregated impression tag input data 64 in a location profile of the plurality of location profiles 22 that is associated with the visited location 52 of that impression tag input 40. In the example of FIG. 2, the impression tag input 40 had the visited location 52 coffee shop A. Thus, the impression tagging engine 20 is configured to aggregate the impression tag input 40 into the location profile that is associated with the coffee shop A location. In this manner, each impression tag input extracted from the various content sources 36 generated by visitors of the coffee shop A location will be aggregated together and stored in the location profile associated with the coffee shop A location.

In one example, to aggregate the impression tag input 40 in a location profile, the impression tagging engine 20 is configured to store and organize all of the impression tag input 40 for the location profile in a data structure suitable for data analysis, such as, for example, a spreadsheet type data structure. Accordingly, the impression tagging engine 20 may be configured to perform data analysis on the aggregated impression tag input data 64 to determine which identified impression tags from the extensible taxonomy of impression tags 30 are most frequently used for a location at each of the plurality of time intervals 28. In another example, the impression tagging engine 20 is configured to aggregate the impression tag inputs 40 by calculating aggregate scores for each impression tag that has been associated with a location at each of the plurality of time intervals 28. These aggregate scores may be updated by the impression tagging engine 20 when new impression tag input 40 is received.

Figure 4:
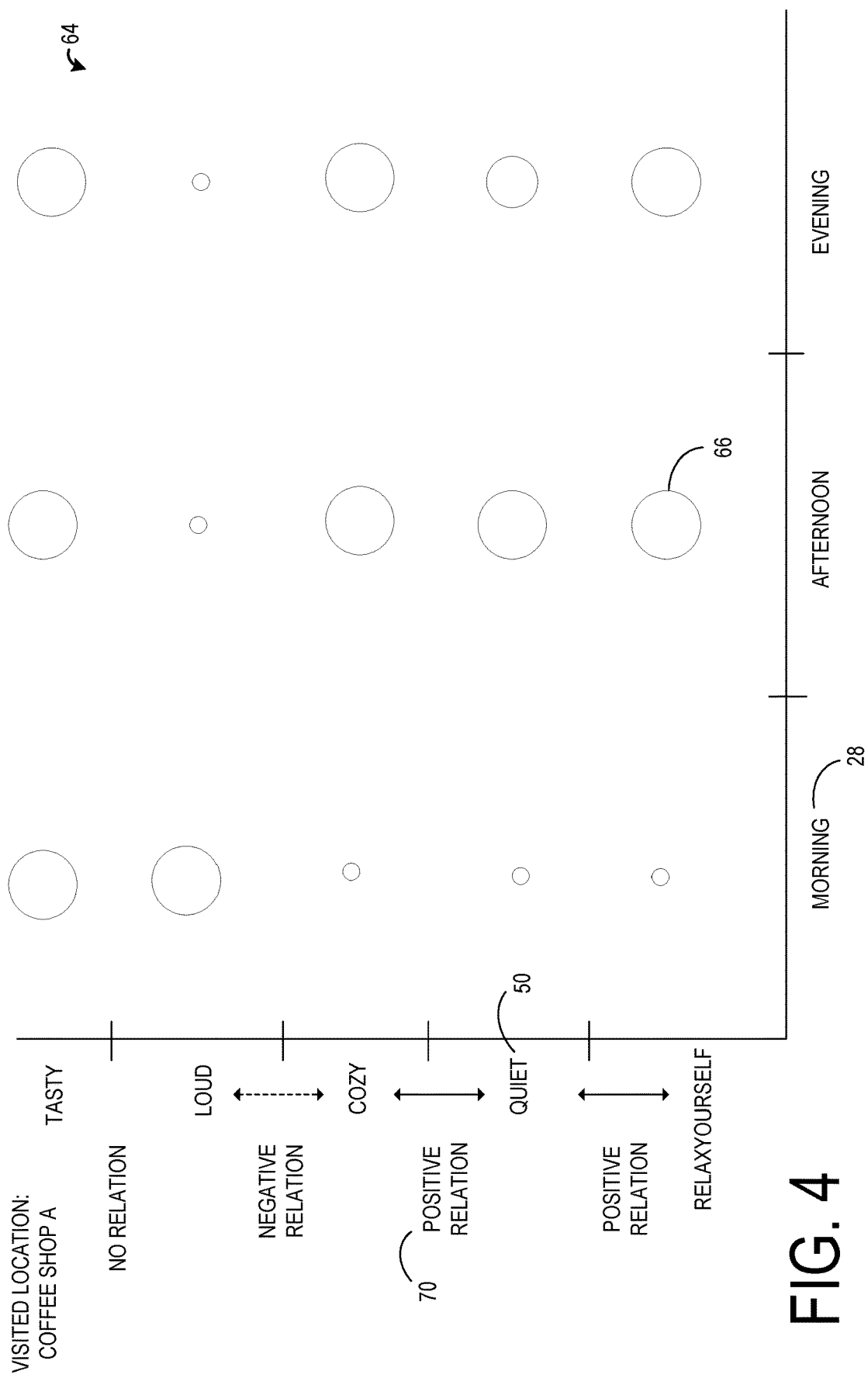
FIG. 4 shows a visual representation of aggregate scores of impression tags aggregated by the server system of FIG. 1.

FIG. 4 illustrates an example of aggregate scores determined for the location profile for the coffee shop A location. In this example, five impression tags have been extracted from visitor impressions 38 for the coffee shop A. The impression tagging engine 20 has computed aggregate scores 66 for each impression tag 50 for each of the plurality of time intervals 28. In the illustrated example, the plurality of time intervals 28 includes a morning, afternoon, and an evening time interval. In this example, higher aggregate scores are visually depicted as a larger circle and lower aggregate scores are visually depicted as a smaller circle. As shown, visitors of the coffee shop A frequently enter "tasty" as an impression during every time interval, but only frequently enter "loud" as an impression during the morning when the coffee shop A is generally busier. On the other hand, during the afternoon and evening time intervals, when the coffee shop A is less busy, visitors frequently enter the impressions "cozy", "quiet", and "relaxyourself", and do not enter those impressions during the morning when the coffee shop A may be crowded, hectic, and loud. Thus, in this manner, the aggregated impression tag input data 64 for each of the plurality of location profiles 22 includes data indicating how frequently each impression tag is used by visitors to describe that location profile's associated location during each time interval of that location profile's plurality of time intervals 28. It will be appreciated that the impression tagging engine 20 may use any suitable methods and data structures to aggregate the impression tag inputs 40.

As shown in FIG. 1, the impression tagging engine 20 is configured to, for each location profile, select one or more categorizing impression tags 68 from the extensible taxonomy of impression tags 30 for each of the plurality of time intervals 28 based on at least the aggregated impression tag input data 64 of that location profile. In one example, the impression tagging engine 20 selects one or more impression tags having the highest aggregate score for each time interval as the categorizing impression tags 68. In the example illustrated in FIG. 4, the impression tags "tasty" and "loud" have the highest aggregate score during the morning time interval, and the impression tags "tasty", "cozy", "quiet", and "relaxyourself", have the highest aggregate score during the afternoon and evening time intervals. Thus, in this example, the impression tagging engine 20 may be configured to select the "tasty" and "loud" impression tags as categorizing impression tags 68 for a morning time interval of the location profile associated with the coffee shop A, and the "tasty", "cozy", "quiet", and "relaxyourself" impression tags as the categorizing impression tags 68 during the afternoon and evening time intervals. In this manner, the extensible taxonomy of impression tags 30 may be used to categorize each location of a plurality of locations based on visitor impressions of those locations.

In one example, the impression tagging engine 20 may be configured to determine that a location profile of the plurality of location profiles 22 includes a categorizing impression tag 68 that has been selected for each of the plurality of time intervals 28 or that has been selected for an amount of time intervals greater than a threshold value. Based upon at least that determination, the impression tagging engine 20 may be further configured to determine that the categorizing impression tag is a time independent categorizing impression tag that is always a categorizing impression tag for that location profile regardless of the plurality of time intervals 28, location conditions, and other factors.

As illustrated in FIG. 4, the impression tagging engine 20 may be further configured to determine relations 70 between two or more impression tags of the extensible taxonomy of impression tags 30 based on at least aggregated impression tag input data 64 of the plurality of location profiles 22. In one example, the impression tagging engine 20 may be configured to perform trend analysis on the aggregated impression tag input data 64 of each location profile to determine correlations between different impression tags. In this example, the impression tagging engine 20 may be configured to determine that two or more impression tags that have similar aggregate scores during the same time interval for a location are likely to be positively correlated. On the other hand, two or more impression tags that have different aggregate scores during the same time interval for a location are likely to be negatively correlated. These determined relations between impression tags may be used by the impression tagging engine 20 to determine meaning for the impression tags, particularly the crowd sourced impression tags 34 that may otherwise have ambiguous meaning to the impression tagging engine 20.

In the example illustrated in FIG. 4, the impression tag "tasty" had a high aggregate score during every time interval while the other impression tags fluctuated. Thus, the "tasty" impression tag may be determined to have no clear relation to the other impression tags. On the other hand, the impression tags "cozy", "quiet", and "relaxyourself", all had similar aggregate scores during each of the plurality of time intervals 28. Thus, in this example, the impression tagging engine 20 may determine that the impression tags "cozy", "quiet", and 'relaxyourself' have a positive relation. Thus, the crowd sourced impression tag "relaxyourself" may be determined to mean both cozy and quiet. On the other hand, the impression tag "loud" has different aggregate scores for each time interval. Accordingly, the impression tag "loud" may be determined to have a negative relation with the impression tags "cozy", "quiet", and "relaxyourself".

In one example, the impression tagging engine 20 may be further configured to determine hierarchical relations between impression tags of the extensible taxonomy of impression tags 30 based on at least aggregated impression tag input data 64 of the plurality of location profiles 22. In the example shown in FIG. 4, the impression tags of "cozy", "quiet", and "relaxyourself" were determined to have positive relations based on the aggregated impression tag input data 64 of the location profile associated with the coffee shop A location. In one specific example, the impression tagging engine 20 may further determine that the "cozy" impression tag has a higher aggregate score for time intervals of the plurality of time intervals compared to the "quiet" and "relaxyourself" impression tags. Based on that determination, the impression tagging engine 20 may be configured to determine that the "cozy" impression tag has a higher hierarchical relation to the "quiet" and "relaxyourself" impression tags, such as, for example, a parent-child hierarchical relation. In this manner, the impression tagging engine 20 may be configured to determine hierarchical relations between sets of related impression tags in the extensible taxonomy of impression tags 30. In this example, the impression tagging engine 20 may be further configured to select categorizing impression tags 68 based on hierarchical relations between impression tags in the aggregated impression tag input data 64 of a location profile. For example, the impression tagging engine 20 may be configured to select an impression tag with the highest hierarchical relation as the categorizing impression tag 68 when the aggregated impression tag input data 64 for a location profile includes multiple impression tags having a positive relation, even though an impression tag having a lower hierarchical relation has a higher aggregate score for a particular time interval.

Figure 5:
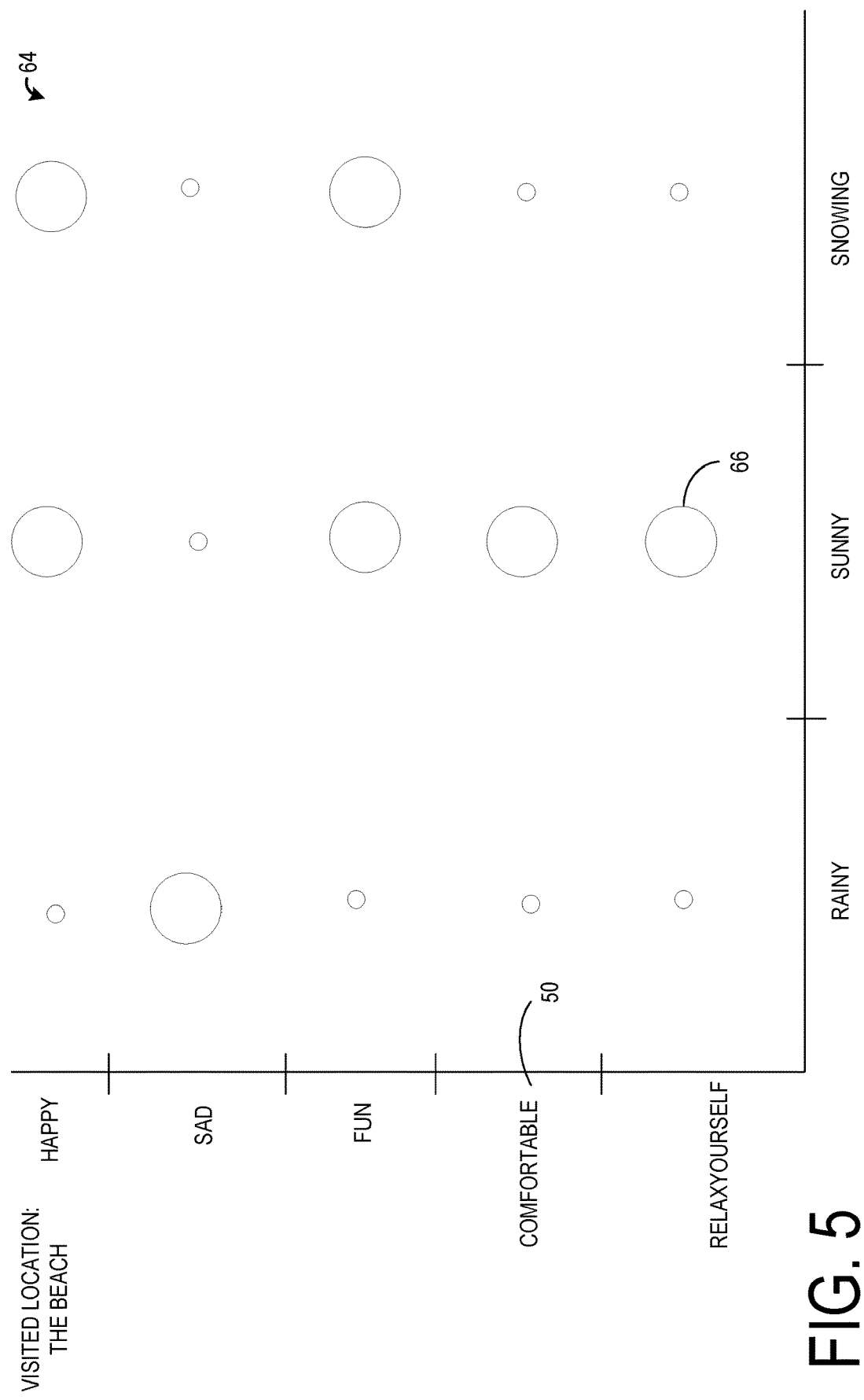
FIG. 5 shows another visual representation of aggregate scores of impression tags aggregated by the server system of FIG. 1.

Turning to FIG. 5, the impression tagging engine 20 may be further configured to select one or more categorizing impression tags 68 from the extensible taxonomy of impression tags 30 for each of the plurality of location conditions based on at least the aggregated impression tag input data of that location profile 64. In the illustrated example, the plurality of location conditions includes weather conditions such as rainy, sunny, and snowing. Thus, as discussed previously, the impression tagging engine 20 is configured to determine the visited location condition data 58, such as the local weather of that location, when the visitor had visited that location. As shown in FIG. 5, aggregate scores for each impression tag 50 may be calculated for each of the plurality of location conditions, such as rainy, sunny, and snowing. Thus, in one example, the impression tagging engine 20 may be configured to select categorizing impression tags 68 for each of the plurality of time intervals and for each of the plurality of location conditions.

In one example, the plurality of location conditions further includes regional conditions. In this example, an example location profile of the plurality of location profiles 22 may include an associated collection of locations. For example, the associated collection of locations may be a plurality of coffee shops A having different locations in the United States. In this example, the visited location condition may be a region that a particular branch of coffee shop A is located. That is, one coffee shop A may have a visited location condition of a Pacific Northwest region, while a different coffee shop A may have a visited location condition of a New England region. Thus, the impression tagging engine 20 may be configured to select categorizing impression tags 68 for all coffee shops A associated with the example location profile, as well as categorizing impression tags 68 for each coffee shop A in the Pacific Northwest region and categorizing impression tags 68 for each coffee shop A in the New England region of the plurality of location conditions. In one specific example, all coffee shops A may have categorizing impression tags 68 of "cozy" and "quiet". Additionally, each coffee shop A having the visited location condition of the Pacific Northwest region may have categorizing tags 68 of "escapetherain", while each coffee shop A having the visited location condition of the New England region may have categorizing tags 68 of "escapethecrowd".

In another example, the plurality of location conditions further includes a location type. For example, the location type may include restaurants, coffee shops, beaches, buildings, stores, landmarks, etc. Thus, the visited location condition data 58 that is extracted from the visitor impression 38 may further include a location type. For example, visitor impressions 38 associated with the location coffee shop A may have extracted visited location condition data 58 including a coffee shop location type. In this example, the impression tagging engine 20 may be configured to select categorizing impression tags 68 for the visited location condition of the coffee shop location type for the location profile associated with coffee shop A. The impression tagine engine 20 may be further configured to aggregate the categorizing impression tags 68 selected for the coffee shop location type for multiple location profiles. That is, a first location profile for the coffee shop A location and a second location profile for a coffee shop B location may both include visited location conditions of the coffee shop location type. The impression tagging engine 20 may be configured to aggregate the categorizing impression tags 68 that were selected for the coffee shop location type for both the first and second location profiles, and determine a trend for the aggregated categorizing impression tags selected for the coffee shop location type. In one specific example, the impression tagging engine 20 may determine a trend that the impression tags of "cozy" and "quiet" tend to be selected as categorizing impression tags 68 for most location profiles having the coffee shop location type. Based on that determination, the impression tagging engine 20 may be further configured to select the "cozy" and "quiet" impression tags for as categorizing impression tags 68 for all location profiles having the coffee shop location type.

It will be appreciated that the above examples of location conditions are merely illustrative, and other types of location conditions not specifically mentioned above may also be included in the plurality of location conditions and visited location condition data 58 for the plurality of location profiles 22.

Now turning back to FIG. 1, each of the plurality of location profiles 22 includes categorizing impression tags 68 selected by the impression tagging engine 20 for a plurality of time intervals 28 and a plurality of location conditions. The categorizing impression tags 68 may be used by the impression tagging engine 20 to select suitable location profiles in response to search requests from user of client computing devices 12.

As shown, the server system 10 may receive, from a client computing device 12, a search request 72 having a requested impression tag 74 and search request context data including a target time interval 76 of the plurality of time intervals. The requested impression tag 74 may include an impression tag from the extensible taxonomy of impression tags 30, and the target time interval 76 may be a time interval for when the search request 72 was generated, or a specific time interval being requested by the user of the client computing device such as for a reservation (e.g. cozy coffee shop at 7:00 PM).

After receiving the search request 72, the impression tagging engine 20 is configured to select a target location profile 78 from the plurality of location profiles 22 that has one or more categorizing impression tags 68 selected for the target time interval 76 of the plurality of time intervals 28 that correspond to the requested impression tag 74. For example, if the search request 72 was "cozy coffee shop at 7:00 PM", the impression tagging engine 20 may be configured to extract "cozy" as the requested impression tag 74 and an evening time interval of the plurality of time intervals 22 as the target time interval 76. Next, the impression tagging engine 20 may search through the plurality of location profiles for location profiles that have one or more categorizing impression tags 68 corresponding to "cozy" during the evening time interval. Thus, in the example illustrated in FIG. 4, the impression tagging engine 20 may determine that the location profile for the coffee shop A includes a "cozy" categorization impression tag 68 during the evening time interval. Accordingly, the impression tagging engine 20 may select the location profile for the coffee shop A as the target location profile 78 as being a suitable response to the search request 72.

After selecting the target location profile 78, the server system 10 may transmit, to the client computing device 12, a search result 80 including the target location profile 78. The client application 42 executed on the client computing device 12 may be configured to present the search result 80 to the user via the GUI 46 shown on the display 48.

In one example, the impression tagging engine 20 is further configured to select a target location profile 78 from the plurality of location profiles 22 that has one or more categorizing impression tags 68 selected for a target location condition of the target location associated with the target location profile at the target time interval 76 that correspond to the requested impression tag 74. In examples that include weather conditions for the plurality of location conditions, the impression tagging engine 20 may be configured to determine the target location condition of the target location based on local weather data at the target time interval 76. Thus, the impression tagging engine 20 may be configured to select a target location profile that includes categorizing impression tags 68 that correspond to the requested impression tag 74 during both the target time interval and the target location condition.

Figure 6:
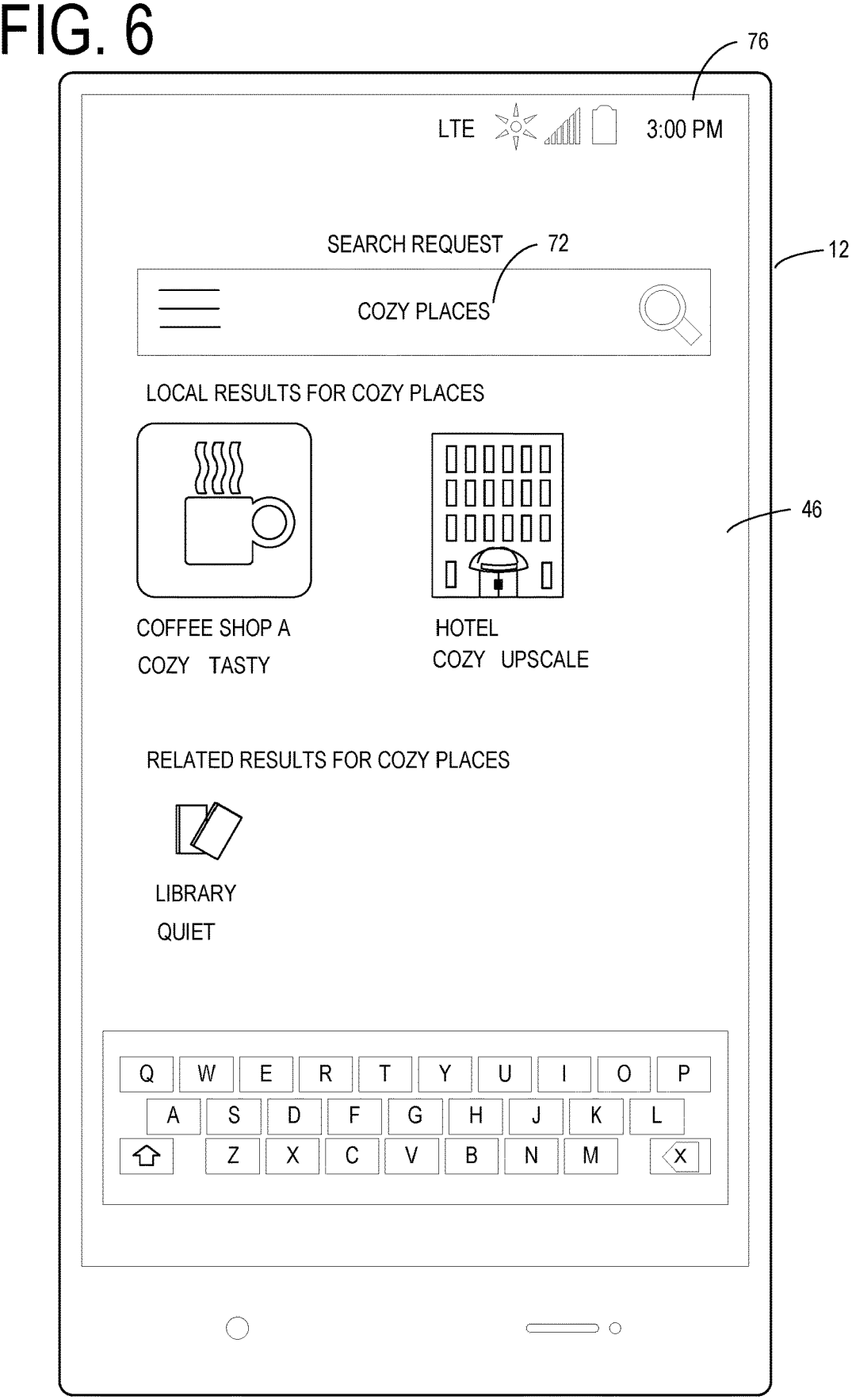
FIG. 6 shows an example graphical user interface for a client application in communication with the server system of FIG. 1.

FIG. 6 illustrates the GUI 46 of the client application 42 presented on the client computing device after a search request 72 was entered by the user. In the illustrated example, the search request 72 was for "cozy places". In one example, the client application 42 may be configured to associate a target time interval 76 to the search request 72. In this example, the target time interval 76 is a current time when the search request 72 was entered by the user. In another example, the target time interval may be a time interval entered by the user as part of the search request (e.g. cozy places at 6:00 PM).

After receiving the search request, the impression tagging engine 20 is configured to extract the requested impression tag 74 from the search request 72. In the example of FIG. 6, the requested impression tag 74 is "cozy", and the target time interval 76 is 3:00 PM. Thus, the impression tagging engine 20 searches through the plurality of location profiles to select a target location profile that has a categorization impression tag corresponding to "cozy" during the afternoon time interval. The target location profile is then transmitted to the client computing device 12 with search results 80. After receiving the search result 80, the client application 42 presents the target location profile in the search result 80 via the GUI 46. As shown in FIG. 6, the target location profile included the location profile for the coffee shop A location, which has a "cozy" categorization tag during the afternoon time interval.

As illustrated in FIG. 6, the search result 80 may include a plurality of target location profiles. In the example of FIG. 6, location profiles for both the coffee shop A location and a hotel location included the "cozy" categorization tag during the afternoon, and were thus both transmitted to the client computing device 12 in the search result 80.

In one example, the impression tagging engine 20 may be further configured to select a target location profile 78 from the plurality of location profiles 22 further based on determined relations 70 between the one or more categorizing impression tags 68 of the target location profile and the requested impression tag 74. As discussed in the example of FIG. 4, the impression tagging engine 20 determined that there is a positive relation between the "cozy" impression tag and the "quiet" impression tag. Thus, in this example, the impression tagging engine 20 may also search for location profiles that include one or more categorizing impression tags 68 that have a positive relation with the requested impression tag 74. Accordingly, the impression tagging engine 20 searched for location profiles that have "cozy" and/or "quiet" categorization tags, and transmitted those location profiles to the client computing device 12. As shown in FIG. 6, the location profile for the library location was also transmitted as a related search result.

Figure 7:
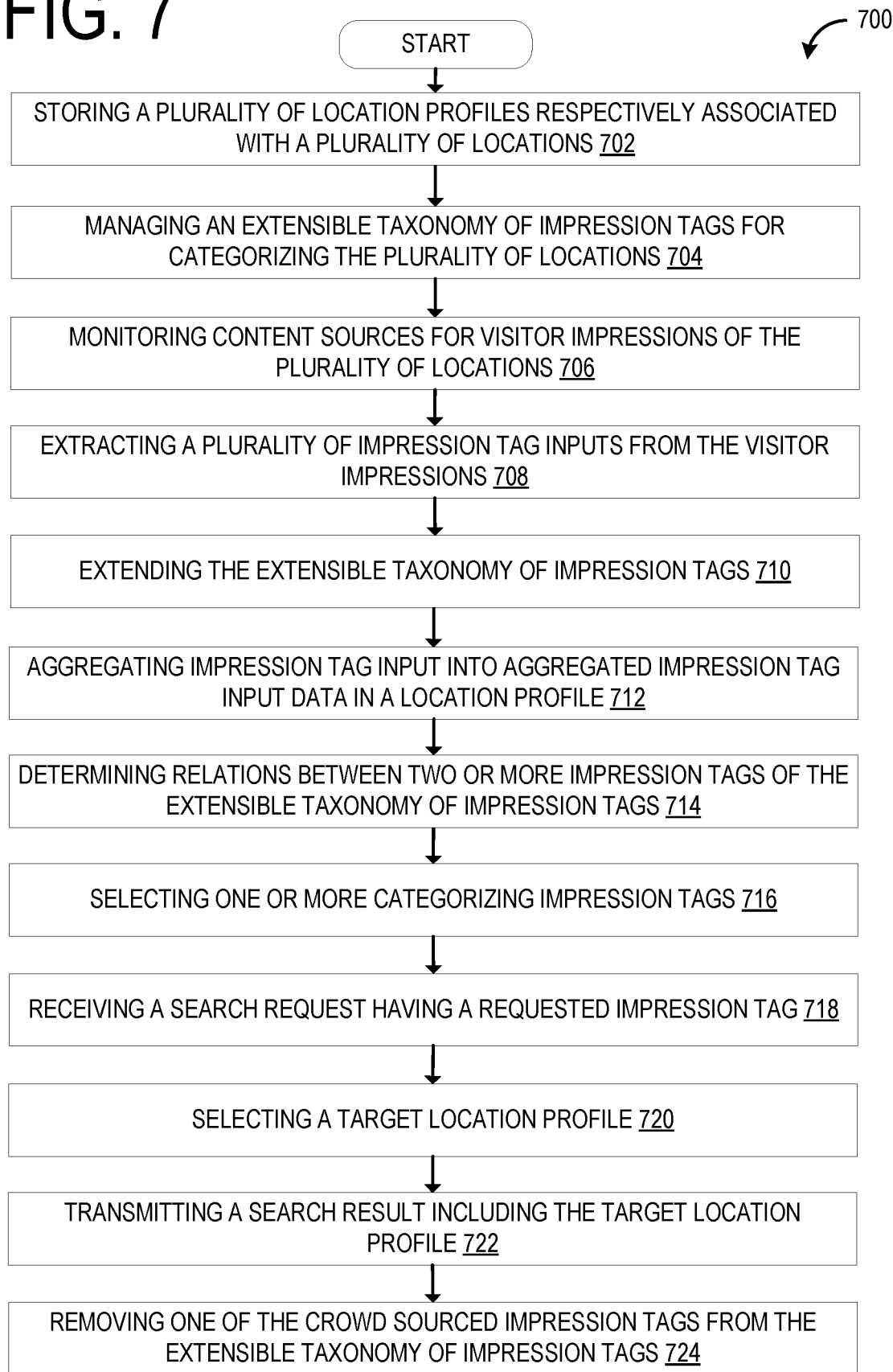
FIG. 7 shows an example method for impression tagging of locations.

FIG. 7 shows an example computer-implemented method 700 according to an embodiment of the present disclosure. At step 702, the method 700 may include, storing a plurality of location profiles respectively associated with a plurality of locations, each location profile having calendar data including a plurality of time intervals. The plurality of location profiles may be stored in non-volatile storage of a server system. The plurality of locations are physical locations in the world and may include buildings, businesses, routes, landmarks, geolocations, collections of locations, and other methods of demarcating locations. In one example, the calendar data for each of the plurality of location profiles includes a plurality of time intervals selected from the group consisting of day, time of day, month, year, and season. In another example, the calendar data for each of the plurality of location profiles includes event time intervals of the plurality of time intervals for events that occur at the associated location. For example, a location that is a store may include a plurality of time intervals for the hours that the store is open. As another example, a public square location may include a plurality of time intervals for the duration of events that will occur at the public square.

Advancing from step 702 to step 704, the method 700 may include managing an extensible taxonomy of impression tags for categorizing the plurality of locations. The extensible taxonomy of impression tags may include words, emoticons, and user uploaded image forms of impression tags. In one example, the extensible taxonomy of impression tags may include dictionary sourced impression tags.

Proceeding from step 704 to step 706, the method 700 may include monitoring content sources for visitor impressions of the plurality of locations. The content sources may include client computing devices, online social networking services, online review services, and other content sources that may provide user impressions of locations in the world.

Advancing from step 706 to step 708, the method 700 may include extracting a plurality of impression tag inputs from the visitor impressions, each impression tag input including an identified impression tag, a visited location of the plurality of locations, and visited location context data including a visited time interval of the plurality of time intervals. The identified impression tags may be extracted based on known language conventions and grammar.

Based on at least determining that one of the identified impression tags of the plurality of extracted impression tag inputs is not included in the extensible taxonomy of impression tags, the method 700 may proceed from step 708 to step 710 and may include extending the extensible taxonomy of impression tags with the one of the identified impression tags as a crowd-sourced impression tag. The extensible taxonomy of impression tags may include both the dictionary sourced impression tags and the crowd sourced impression tags.

Advancing from step 710 to step 712, the method 700 may include, for each impression tag input, aggregating that impression tag input into aggregated impression tag input data in a location profile of the plurality of location profiles that is associated with the visited location of that impression tag input. In one example, aggregating the impression tag input may include organizing all of the impression tag input for a location profile in a data structure suitable for data analysis, such as, for example, a spreadsheet type data structure. In another example, aggregating the impression tag inputs may include calculating aggregate scores for each impression tag that has been associated with a location at each of the plurality of time intervals. These aggregate scores may be updated when new impression tag input is received.

Proceeding from step 712 to step 714, the method 700 may include determining relations between two or more impression tags of the extensible taxonomy of impression tags based on at least aggregated impression tag input data of the plurality of location profiles. In one example, step 714 may further include performing trend analysis on the aggregated impression tag input data of each location profile to determine correlations between different impression tags. Step 714 may further include determining that two or more impression tags that have similar aggregate scores during the same time interval for a location are likely to be positively correlated. On the other hand, two or more impression tags that have different aggregate scores during the same time interval for a location are likely to be negatively correlated.

Advancing from step 714 to step 716, the method 700 may include, for each location profile, selecting one or more categorizing impression tags from the extensible taxonomy of impression tags for each of the plurality of time intervals based on at least the aggregated impression tag input data of that location profile. In one example, step 716 includes selecting one or more impression tags having the highest aggregate score for each time interval as the categorizing impression tags.

Proceeding from step 716 to step 718, the method 700 may include receiving a search request having a requested impression tag and search request context data including a target time interval of the plurality of time intervals. The requested impression tag may be included in the extensible taxonomy of impression tags.

Advancing from step 718 to step 720, the method 700 may include selecting a target location profile from the plurality of location profiles that has one or more categorizing impression tags selected for the target time interval of the plurality of time intervals that correspond to the requested impression tag. In one example, step 720 may include selecting a target location profile that includes one or more categorization impression tags that are the same at the request impression tag during the target time interval. In another example, step 720 further includes selecting a target location profile from the plurality of location profiles further based on determined relations between the one or more categorizing impression tags of the target location profile and the requested impression tag.

Proceeding from step 720 to step 722, the method 700 may include transmitting a search result including the target location profile. In one example, the search result may include a plurality of target location profiles.

Advancing from step 722 to step 724, the method 700 may include, based on at least determining that one of the crowd-sourced impression tags of the extensible taxonomy of impression tags has an extraction frequency that is lower than a threshold frequency value, removing the one of the crowd-sourced impression tags from the extensible taxonomy of impression tags. The threshold frequency value may be set to any value suitable value. For example, the threshold frequency value may be set to 10 extractions per month, such that if a specific crowd sourced impression tag is being extracted and identified less than 10 times per month, then step 724 may include removing that specific crowd sourced impression tag from the extensible taxonomy of impression tags.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
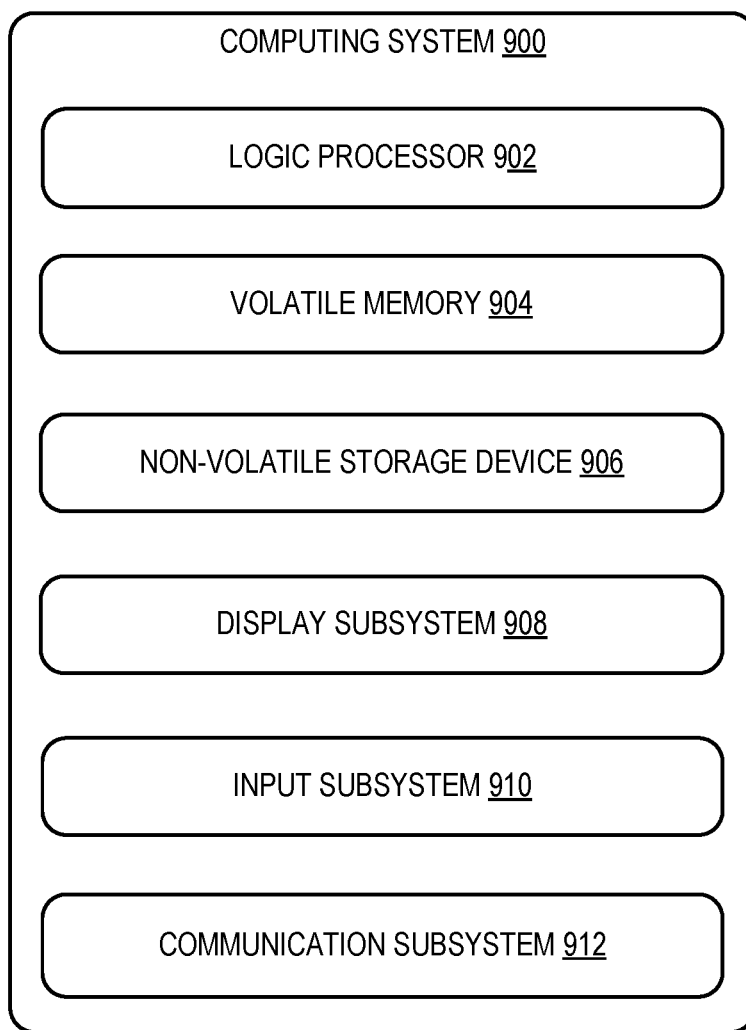
FIG. 8 shows an example computing system according to an embodiment of the present disclosure.

FIG. 8 schematically shows a non-limiting embodiment of a computing system 900 that can enact one or more of the methods and processes described above. Computing system 900 is shown in simplified form. Computing system 900 may embody the server system 10 and client computing devices 12 described above. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 8.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 906 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a server system comprising a processor configured to store a plurality of location profiles respectively associated with a plurality of locations, each location profile having calendar data including a plurality of time intervals, manage an extensible taxonomy of impression tags for categorizing the plurality of locations, monitor content sources for visitor impressions of the plurality of locations and extract a plurality of impression tag inputs from the visitor impressions, each impression tag input including an identified impression tag, a visited location of the plurality of locations, and visited location context data including a visited time interval of the plurality of time intervals, based on at least a determination that one of the identified impression tags of the plurality of extracted impression tag inputs is not included in the extensible taxonomy of impression tags, extend the extensible taxonomy of impression tags with the one of the identified impression tags as a crowd-sourced impression tag, for each impression tag input, aggregate that impression tag input into aggregated impression tag input data in a location profile of the plurality of location profiles that is associated with the visited location of that impression tag input, and for each location profile, select one or more categorizing impression tags from the extensible taxonomy of impression tags for each of the plurality of time intervals based on at least the aggregated impression tag input data of that location profile. In this aspect, additionally or alternatively, the processor may be further configured to receive, from a client computing device, a search request having a requested impression tag and search request context data including a target time interval of the plurality of time intervals, select a target location profile from the plurality of location profiles that has one or more categorizing impression tags selected for the target time interval of the plurality of time intervals that correspond to the requested impression tag, and transmit, to the client computing device, a search result including the target location profile. In this aspect, additionally or alternatively, the plurality of locations may be selected from the group consisting of buildings, businesses, routes, landmarks, geolocations, and collections of locations. In this aspect, additionally or alternatively, the calendar data for each of the plurality of location profiles may include a plurality of time intervals selected from the group consisting of day, time of day, month, year, and season. In this aspect, additionally or alternatively, the calendar data for each of the plurality of location profiles includes event time intervals of the plurality of time intervals for events that occur at the associated location. In this aspect, additionally or alternatively, the extensible taxonomy of impression tags may include words, emoticons, and user uploaded images. In this aspect, additionally or alternatively, based on at least a determination that one of the crowd-sourced impression tags of the extensible taxonomy of impression tags has an extraction frequency that is lower than a threshold frequency value, the processor may be further configured to remove the one of the crowd-sourced impression tags from the extensible taxonomy of impression tags. In this aspect, additionally or alternatively, the processor may be further configured to determine relations between two or more impression tags of the extensible taxonomy of impression tags based on at least aggregated impression tag input data of the plurality of location profiles, and select a target location profile from the plurality of location profiles further based on determined relations between the one or more categorizing impression tags of the target location profile and the requested impression tag. In this aspect, additionally or alternatively, the processor may be further configured to send the extensible taxonomy of impression tags to a client computing device, and receive an impression tag input from the client computing device including a user selection of one of the impression tags from the extensible taxonomy of impression tags as the identified impression tag. In this aspect, additionally or alternatively, visited location context data of each impression tag input may further include a visited location condition of a plurality of location conditions, and wherein the processor may be further configured to select one or more categorizing impression tags from the extensible taxonomy of impression tags for each of the plurality of location conditions based on at least the aggregated impression tag input data of that location profile, and select a target location profile from the plurality of location profiles that has one or more categorizing impression tags selected for a target location condition of the target location associated with the target location profile at the target time interval that correspond to the requested impression tag. In this aspect, additionally or alternatively, the plurality of location conditions may include weather conditions.

Another aspect provides a method comprising storing a plurality of location profiles respectively associated with a plurality of locations, each location profile having calendar data including a plurality of time intervals, managing an extensible taxonomy of impression tags for categorizing the plurality of locations, monitoring content sources for visitor impressions of the plurality of locations and extracting a plurality of impression tag inputs from the visitor impressions, each impression tag input including an identified impression tag, a visited location of the plurality of locations, and visited location context data including a visited time interval of the plurality of time intervals, based on at least determining that one of the identified impression tags of the plurality of extracted impression tag inputs is not included in the extensible taxonomy of impression tags, extending the extensible taxonomy of impression tags with the one of the identified impression tags as a crowd-sourced impression tag, for each impression tag input, aggregating that impression tag input into aggregated impression tag input data in a location profile of the plurality of location profiles that is associated with the visited location of that impression tag input, and for each location profile, selecting one or more categorizing impression tags from the extensible taxonomy of impression tags for each of the plurality of time intervals based on at least the aggregated impression tag input data of that location profile. In this aspect, additionally or alternatively, the method may further comprise receiving a search request having a requested impression tag and search request context data including a target time interval of the plurality of time intervals, selecting a target location profile from the plurality of location profiles that has one or more categorizing impression tags selected for the target time interval of the plurality of time intervals that correspond to the requested impression tag, and transmitting a search result including the target location profile. In this aspect, additionally or alternatively, the plurality of locations may be selected from the group consisting of buildings, businesses, routes, landmarks, geolocations, and collections of locations. In this aspect, additionally or alternatively, the calendar data for each of the plurality of location profiles may include a plurality of time intervals selected from the group consisting of day, time of day, month, year, and season. In this aspect, additionally or alternatively, the calendar data for each of the plurality of location profiles may include event time intervals of the plurality of time intervals for events that occur at the associated location. In this aspect, additionally or alternatively, the extensible taxonomy of impression tags may include words, emoticons, and user uploaded images. In this aspect, additionally or alternatively, the method may further comprise based on at least determining that one of the crowd-sourced impression tags of the extensible taxonomy of impression tags has an extraction frequency that is lower than a threshold frequency value, removing the one of the crowd-sourced impression tags from the extensible taxonomy of impression tags. In this aspect, additionally or alternatively, the method may further comprise determining relations between two or more impression tags of the extensible taxonomy of impression tags based on at least aggregated impression tag input data of the plurality of location profiles, and selecting a target location profile from the plurality of location profiles further based on determined relations between the one or more categorizing impression tags of the target location profile and the requested impression tag.

Another aspect provides a server system comprising a processor configured to store a plurality of location profiles respectively associated with a plurality of locations, manage an extensible taxonomy of impression tags for categorizing the plurality of locations, monitor content sources for visitor impressions of the plurality of locations and extract a plurality of impression tag inputs from the visitor impressions, each impression tag input including an identified impression tag and a visited location of the plurality of locations, based on at least a determination that one of the identified impression tags of the plurality of extracted impression tag inputs is not included in the extensible taxonomy of impression tags, extend the extensible taxonomy of impression tags with the one of the identified impression tags as a crowd-sourced impression tag, for each impression tag input, aggregate that impression tag input into aggregated impression tag input data in a location profile of the plurality of location profiles that is associated with the visited location of that impression tag input, and for each location profile, select one or more categorizing impression tags from the extensible taxonomy of impression tags based on at least the aggregated impression tag input data of that location profile.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a server system at which an extensible taxonomy of impression tags is stored; and
a client computing device including a processor configured to:
send, to the server system, a search request including user input indicating a requested impression tag and a target time interval of a plurality of time intervals;
receive, from the server system, a search result including a target location profile that was selected from a plurality of location profiles respectively associated with a plurality of locations, the target location profile being associated with one or more categorizing impression tags for the target time interval of the plurality of time intervals that correspond to the requested impression tag, wherein the requested impression tag is included in the extensible taxonomy of impression tags;
present the target location profile to a user of the client computing device;
determine a visited location of the user of the client computing device from the plurality of locations at a visited time interval of the plurality of time intervals;
receive, from the server system, one or more suggested impression tags for the visited location and visited time interval from the extensible taxonomy of impression tags;
present the one or more suggested impression tags;
receive a user input indicating, for a user impression of the visited location and visited time interval:
a user selection of one or more impression tags from the one or more suggested impression tags, and
one or more additional impression tags not included in the extensible taxonomy of impression tags; and
send, to the server system, a user impression input for the visited location and visited time interval, including the user selection of the one or more impression tags, and the one or more additional impression tags for inclusion in the extensible taxonomy of impression tags.

2. The computing system of claim 1, wherein the plurality of locations are selected from the group consisting of buildings, businesses, routes, landmarks, geolocations, and collections of locations.

3. The computing system of claim 1, wherein the plurality of time intervals are selected from the group consisting of day, time of day, month, year, and season.

4. The computing system of claim 1, wherein the extensible taxonomy of impression tags includes words, emoticons, and user uploaded images.

5. The computing system of claim 1, wherein the processor is further configured to:
   determine a current time interval from the plurality of time intervals indicating the visited time interval that the user visited the visited location; and
   send the current time interval with the user impression input to the server system.

6. The computing system of claim 1, wherein the processor is further configured to:
   determine a visited location condition from a plurality of location conditions at the visited time interval that the user visited the visited location; and
   send the determined visited location condition with the user impression input to the server system.

7. The computing system of claim 6, wherein the plurality of location conditions includes weather conditions.

8. A method comprising:
   at a server system, storing an extensible taxonomy of impression tags;
   at a processor of a client computing device:
      sending, to the server system, a search request including user input indicating a requested impression tag and a target time interval of a plurality of time intervals;
      receiving, from the server system, a search result including a target location profile that was selected from a plurality of location profiles respectively associated with a plurality of locations, the target location profile being associated with one or more categorizing impression tags for the target time interval of the plurality of time intervals that correspond to the requested impression tag, wherein the requested impression tag is included in the extensible taxonomy of impression tags;
      presenting the target location profile to a user of the client computing device;
      determining a visited location of the user of the client computing device from the plurality of locations at a visited time interval of the plurality of time intervals;
      receiving, from the server system, one or more suggested impression tags for the visited location and visited time interval from the extensible taxonomy of impression tags;
      presenting the one or more suggested impression tags;
      receiving a user input indicating, for a user impression of the visited location and visited time interval:
         a user selection of one or more impression tags from the one or more suggested impression tags, and
         one or more additional impression tags not included in the extensible taxonomy of impression tags; and
      sending, to the server system, a user impression input for the visited location and visited time interval, including the user selection of the one or more impression tags, and the one or more additional impression tags for inclusion in the extensible taxonomy of impression tags.

9. The method of claim 8, wherein the plurality of locations are selected from the group consisting of buildings, businesses, routes, landmarks, geolocations, and collections of locations.

10. The method of claim 8, wherein the plurality of time intervals are selected from the group consisting of day, time of day, month, year, and season.

11. The method of claim 8, wherein the extensible taxonomy of impression tags includes words, emoticons, and user uploaded images.

12. The method of claim 8, further comprising:
    determining a current time interval from the plurality of time intervals indicating the visited time interval that the user visited the visited location; and
    sending the current time interval with the user impression input to the server system.

13. The method of claim 8, further comprising:
    determining a visited location condition from a plurality of location conditions at the visited time interval that the user visited the visited location; and
    sending the determined visited location condition with the user impression input to the server system.

* * * * *